UNITED STATES PATENT OFFICE.

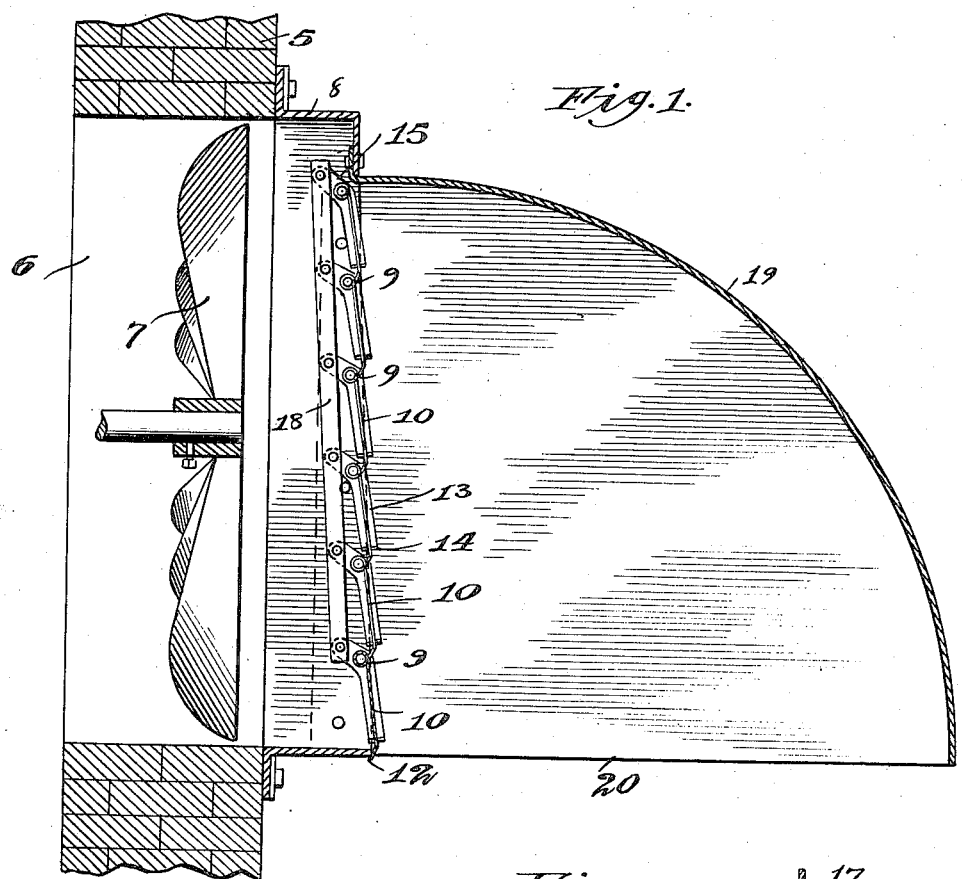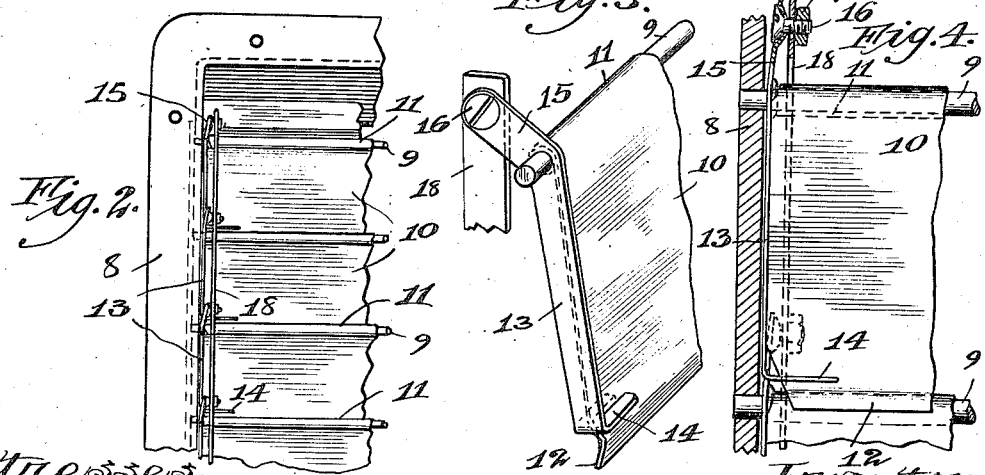

ROBERT A. ILG, OF CHICAGO, ILLINOIS.

SHUTTER MECHANISM.

1,189,572.  Specification of Letters Patent.  Patented July 4, 1916.

Application filed March 9, 1914. Serial No. 823,557.

*To all whom it may concern:*

Be it known that I, ROBERT A. ILG, a citizen of the United States, residing at Chicago, in the county of Cook and State of Illinois, have invented certain new and useful Improvements in Shutter Mechanisms, of which the following is a specification.

This invention relates to shutter mechanisms, and is designed mainly for use in connection with shutter devices employed in connection with ventilating fans such as are located in suitable openings in external walls of buildings for drawing off gases and foul air from the latter. In apparatus of this type it is quite commonly the practice to employ opposite the discharge side of the fan a shutter to normally close the opening when the fan is idle. In some instances the shutter vanes are positively opened and closed through electrical or other actuating means, and in other instances the shutters are so constructed and mounted as to be opened by the blast of the fan and to close by gravity.

My present invention relates to shutter mechanism of the last named type, and the main object of the invention is to provide a mechanism wherein a positive and complete gravity closure of the shutter vane is secured. Heretofore, so far as I am aware, it has been the practice to pivot the shutter vanes on axes which are in a vertical plane. The result is that owing to friction and other causes the shutter vanes, when the fan ceases its operation, fail to close against each other in a perfect manner, thus leaving cracks between the adjacent edges of adjacent vanes through which cold drafts, rain and snow find ready entrance. I have discovered that this fault may be effectively remedied by so mounting the shutter vanes that their pivotal axes shall lie in a plane that is downwardly and outwardly inclined relatively to the discharge side of the fan, as a result of which, when the shutter vanes drop by gravity to closed position they do not have to swing to vertical position in order to bring their overlapping edges into contact with each other.

Another feature of my invention, which is capable of application generally to shutters of the pivoted vane type, resides in a novel device for effecting simultaneous and equal opening and closing movements of the shutter vanes irrespective of the relative strengths of the fan blast upon the individual vanes and difference in gravity effect of the several vanes.

My invention, its mode of operation, and the benefits and advantages secured thereby will all be readily understood when considered in connection with the accompanying drawing illustrating one approved embodiment of the invention, in which—

Figure 1 is a vertical section through a ventilating opening in an external wall of a building, showing my invention applied thereto. Fig. 2 is a fragmentary inner or rear elevation of a corner portion of the shutter frame and shutter. Fig. 3 is a perspective detail of a portion of a single shutter vane and its spindle and shutter-engaging arm and link. Fig. 4 is a fragmentary outer elevation of a pair of shutter vanes and their connections, in vertical section through one side of the shutter-frame.

Referring to the drawing, 5 designates an external wall of a building in which is formed a ventilating opening 6. Within said opening is mounted a ventilating fan 7 that, in practice, is usually driven by an electric motor (not shown).

Secured to the outer side of the wall 5 and surrounding the ventilating opening 6 is a rectangular shutter-frame 8, in and between the vertical sides of which are journaled a series of horizontal shutter spindles 9.

10 designates the shutter vanes, each of which comprises a rectangular strip of sheet metal that is curled at its upper longitudinal edge around the spindle 9, as shown at 11. The lower free longitudinal edge of each vane 10 is preferably bent inwardly slightly as most clearly shown at 12 in Fig. 3, and said inwardly bent edge overlaps the rounded upper edge of the next lowermost vane, as clearly shown in Figs. 1 and 4.

By reference to Fig. 1 it will be observed, as constituting a leading feature of the invention, that the pivotal axes of the spindles 9 of the several shutter vanes are all located in a plane that is not vertical, but is outwardly and downwardly inclined relatively to the vertical plane of the discharge side of the fan 7. As a result of this mode of mounting the vanes, the latter assume by gravity a completely closed position without requiring the swinging of each vane to a vertical position. As the gravity-closing effect gradually decreases from the maximum when the vane is horizontal to zero when the vane is vertical, the advantage, in a gravity-closed vane, of securing a complete closing of the shutter at a point in the swinging movement of the vanes that is short of the vertical position of the latter will be apparent.

To secure simultaneous and equal opening and closing movements of the several vanes I connect the latter together by a mechanism which comprises a series of metal strips that are mounted on the respective spindles 9, and preferably rigid with the latter, each of said strips comprising a downwardly and forwardly projecting arm 13 having an inturned forked end 14 that embraces the end edge of the vane 10 and a rearwardly extending arm 15. The outer ends of the arms 15 are pivotally united through screws 16 and nuts 17, or any other suitable pivot joints, to a connecting link 18.

Where a ventilating shutter of this type is mounted in or upon an external wall of a building, the operation of the shutter is frequently obstructed or interfered with by counter-winds blowing upon the outer sides of the vanes. To obviate this difficulty I provide a hood or shield 19 of generally quadrant form that is attached to the outer side of the shutter-frame 8 and makes a joint with the latter on its upper horizontal and its two vertical edges, and affords a covering for the outer sides of the vanes. The lower and open side 20 of this hood is preferably on a level with the lower edge of the shutter and also has an area not less than the area of the shutter opening in order that it may not hinder the free opening action of the shutter vanes under the fan blast through any contraction of the discharge opening of the hood. It will be manifest that this hood not only shields the outer sides of the vanes from the effects of counter-winds, but that the latter, in sweeping across the open lower side 20 of the hood facilitate the opening of the shutter vanes through a suction effect.

Without limiting myself to the exact detail construction and arrangement of the parts described, I claim—

1. In a shutter mechanism, the combination of a rectangular frame, a series of horizontal shutter spindles journaled in and between the vertical sides of said frame, the axes of said spindles being located in a plane that is downwardly and outwardly inclined relatively to a vertical plane passing through the axis of the topmost spindle, and a plurality of gravity-closed and outwardly opening sheet metal shutter-vanes curled at their upper edge portions around said spindles and having inwardly bent lower edge portions overlapping when in closed position, the upper edges of the next shutter-vanes therebeneath.

2. In a shutter mechanism, the combination with a series of depending hinged shutter-vanes mounted in suspended and overlapping relation in an external wall of a building and adapted to open outwardly, of a hood or shield covering the outer sides of said shutter-vanes and open on its lower side only substantially in the horizontal plane of the lower edge of the lowermost shutter-vane.

3. In a shutter mechanism, the combination with a series of depending hinged shutter-vanes mounted in superposed and overlapping relation in an external wall of a building and adapted to open outwardly, of a hood or shield of generally quadrant form covering the outer sides of said shutter-vanes and open on its lower side only substantially in the horizontal plane of the lower edge of the lowermost shutter-vane, the area of said open side of the hood being not less than the area of the opening covered by said shutter-vanes.

4. In a shutter mechanism, the combination of a rectangular frame, spindles pivotally mounted in opposite side walls of said frame, shutter-vanes secured at one longitudinal edge to said spindles, vane-actuating strips mounted on said spindle opposite an end of said vanes, each of said strips comprising an arm extending parallel with and at its other end engaging the end edge of a vane and a rearwardly extending arm, and a link pivotally connecting said rearwardly extending arms.

5. In a shutter mechanism, the combination of a rectangular frame, spindles pivotally mounted in opposite side walls of said frame, shutter-vanes having their upper longitudinal edges curled around said spindles, vane-actuating strips mounted on said spindles opposite an end of said vanes, each of said strips comprising an arm extending parallel with the end edge of a vane and having an inturned forked end embracing the latter and a rearwardly extending arm, and a link pivotally connecting the outer ends of said rearwardly extending arms.

ROBERT A. ILG.

Witnesses:
SAMUEL N. POND,
EDMUND G. INGERSOLL.